(12) United States Patent
Zane et al.

(10) Patent No.: US 8,782,075 B2
(45) Date of Patent: Jul. 15, 2014

(54) QUERY HANDLING IN DATABASES WITH REPLICATED DATA

(75) Inventors: Barry M. Zane, La Jolla, CA (US); David E. Steinhoff, Ann Arbor, MI (US); Mario A. Guthrie, Chula Vista, CA (US)

(73) Assignee: Paraccel LLC, Campbell, CA (US)

( * ) Notice: Subject to any disclaimer, the term of this patent is extended or adjusted under 35 U.S.C. 154(b) by 1409 days.

(21) Appl. No.: 11/746,001

(22) Filed: May 8, 2007

(65) Prior Publication Data

US 2008/0281784 A1    Nov. 13, 2008

(51) Int. Cl.
*G06F 17/30*    (2006.01)

(52) U.S. Cl.
USPC ........................................... 707/769

(58) Field of Classification Search
CPC .............................................. G06F 17/30315
See application file for complete search history.

(56) References Cited

U.S. PATENT DOCUMENTS

| | | | | |
|---|---|---|---|---|
| 5,845,276 | A * | 12/1998 | Emerson et al. ...................... | 1/1 |
| 6,385,604 | B1 | 5/2002 | Bakalash et al. | |
| 6,434,544 | B1 | 8/2002 | Bakalash et al. | |
| 6,453,316 | B1 | 9/2002 | Karibe et al. ...................... | 707/8 |
| 6,950,848 | B1 * | 9/2005 | Yousefi'zadeh .............. | 709/203 |
| 7,024,414 | B2 | 4/2006 | Sah et al. ....................... | 707/101 |
| 7,197,519 | B2 | 3/2007 | Nishikawa et al. ............ | 707/202 |
| 7,200,607 | B2 * | 4/2007 | Downs ................................ | 1/1 |
| 7,249,118 | B2 * | 7/2007 | Sandler et al. .................... | 707/1 |
| 7,409,588 | B2 * | 8/2008 | Yako et al. ....................... | 714/15 |
| 2002/0004799 | A1 * | 1/2002 | Gorelik et al. ................ | 707/201 |
| 2003/0195940 | A1 | 10/2003 | Basu et al. ..................... | 709/213 |
| 2003/0204510 | A1 * | 10/2003 | Ball et al. ....................... | 707/100 |
| 2003/0212789 | A1 * | 11/2003 | Hamel et al. ................... | 709/225 |
| 2003/0217033 | A1 | 11/2003 | Sandler et al. | |
| 2005/0076067 | A1 | 4/2005 | Bakalash et al. | |
| 2005/0256908 | A1 * | 11/2005 | Yang et al. ..................... | 707/200 |
| 2006/0020580 | A1 * | 1/2006 | Dettinger et al. ................. | 707/3 |
| 2007/0271280 | A1 * | 11/2007 | Chandasekaran ............. | 707/100 |
| 2008/0034205 | A1 | 2/2008 | Alain et al. .................... | 713/160 |
| 2008/0162590 | A1 * | 7/2008 | Kundu et al. ................. | 707/202 |

FOREIGN PATENT DOCUMENTS

WO    WO 2005/098655    10/2005

OTHER PUBLICATIONS

A case for fractured mirrors, Ravishankar Ramamurthy, David J. DeWitt, and Qi Su, The VLDB Journal vol. 12, No. 2, Aug. 2003. pages 89-101.*
Gupta et al. Aggregate-Query Processing in Data Warehousing Environments, Proceedings of the 21st VLDB Conference 1995.*
Ravishankar Ramamurthy et al., "A Case for Fractured Mirrors", *Proceedings of the 28$^{th}$ VLDB Conference*, Hong Kong, China, 2002, XP009104035, 12 pages.

(Continued)

*Primary Examiner* — Kevin L Young
(74) *Attorney, Agent, or Firm* — Fenwick & West LLP

(57) ABSTRACT

The same data is stored in at least two different database management systems (DBMS's), including a columnar DBMS (320.2) and a non-columnar (e.g. row-oriented) DBMS (320.1). The columnar DBMS may provide fast responses to queries involving aggregation, and such queries can be routed to the columnar DBMS. A query may be routed to the non-columnar DBMS if for example the query execution involves only small DBMS tables on the non-columnar DBMS. In some situations, an execution time estimate can be obtained from each DBMS, and the query is routed to the DBMS providing the shortest estimate.

13 Claims, 2 Drawing Sheets

(56) References Cited

OTHER PUBLICATIONS

Biplob Kumar Debnath et al., "A Survey of Techniques Used to Reduce the Semantic Gap Between Database Management Systems and Storage Subsystems", *Final Project Report 28*, Nov. 28, 2006, XP009104006, 16 pages.

Stavros Harizopoulos et al., "Performance Tradeoffs in Read-Optimized Databases", *Proceedings of VLDB 2006*, Sep. 12, 2006, Seoul, Korea, XP009104040, pp. 487-498.

Anastassia Ailamaki et al., "Weaving Relations for Cache Performance", *Proceedings of the 27th VLDB Conference*, Roma, Italy, 2001, XP009104041, 12 pages.

Andrew S. Tanenbaum, "Computer Networks, Third Edition", Prentice Hall PTR, Jan. 1, 1996, XP002929437, 41 pages.

J. Postel et al., "RFC 959, Request for Comments, File Transfer Protocol", Network Working Group Request for Comments, Oct. 1, 1985, XP-002151678, 69 pages.

IBM Informix Dynamic Server Performance Guide, Query Plan Report, http://publib.boulder.ibm.com/infocenter/ids9help/index.jsp?topic=/com.ibm.perf.doc/perf281.htm, Nov. 2, 2005, pp. 1-2.

OLAP for the Masses, Intelligent Enterprise Magazine, Oct. 1998, vol. 1—No. 1 http://www.intelligententerprise.com/db_area/archives/1998/9810/feat2.jhtml, pp. 1-4.

Stonebraker, Mike et al. "C-Store: A Column-oriented DBMS" Proceedings of the 31st VLDB Conference, Trondheim, Norway, 2005.

* cited by examiner

QUERY HANDLING IN DATABASES WITH REPLICATED DATA

BACKGROUND OF THE INVENTION

The present invention relates to database management systems, and more particularly to database query handling.

Commercial database systems accumulate data through OLTP (On Line Transaction Processing) operations. FIG. 1 illustrates a number of OLTP clients 110 each of which may be, for example, a cash register in a company store. Each sale of a particular product may generate a record such as:

<cashier's name; cash register ID; store location; product ID; price per item; quantity sold; time of sale; . . . > (1)

This record is temporarily stored in Operation Data Store (ODS) 120 in a row-oriented structure that reflects the atomicity of the collection method. Thus, the record's different fields are stored sequentially in computer storage, e.g. on a magnetic disk. ODS 120 periodically flushes its records to a persistent storage repository provided by a host database system (HDS) 130. Data may be reorganized on HDS 130 to provide data warehouse (DW) functionality, i.e. speedy generation of responses to complex analytic queries (generation of such responses is referred to as OLAP, or On Line Analytic Processing). The reorganization process may involve normalization to standardize representational references. Normalization may take an ODS structure containing a main transaction table (i.e. the table of records (1) stored in rows) and a small number of lookup tables and generate dozens of targeted tables. A targeted table contains more than one, but less than all, of the attributes of records (1). Each record (1) retains a row structure and maintains its referential integrity in HDS 130, but is distributed over multiple tables in non-atomic form. Multiple joins are later needed to reconstruct an individual record. One factor contributing to the cost (time) to execute join operations is reading the data (IO) from the disk into operating memory (e.g. semiconductor memory) and scanning the rows. Computational costs are typically an order of magnitude less than the IO cost for a given analytic or reporting query. Modern HDS's use a variety of techniques to tune the performance of join operations, principally relying on keys and indexes to isolate value references in a field in one table to their definitions in another table.

The ordinary normalization process leads to inefficiencies for analytical purposes, where it may become necessary to read data from a large number of tables in order to calculate aggregated or fully qualified results. Consequently, many companies create a third representational form of the data by reorganizing the contents of the DW into multiple data marts (DMs) using star schema structures to reduce the number of tables involved in join operations. While this approach has benefits that make it more efficient than attempting to report against the DW, inherent problems remain which limit the usefulness of the DM approach in the presence of divergent reporting requirements and increasing data volumes. Among these are that the rows in star schema dimensional and fact tables tend to be wide, and the number of rows in the fact tables tends to grow over time. Thus, the IO problem remains a constraint limiting the usability of star schema solutions.

The use of multidimensional representations (OLAP cubes) addresses these limitations to some degree, by precalculating aggregated results of interest and storing them in atomic form. Immediate results may often be acquired from cubes, but introduce additional costs that mitigate their value. Since the data is stored in aggregated results form in the cube, secondary query operations are required to retrieve the detailed atomic data that underlies the cube elements. This may require that DMs still be retained, which therefore expands the number of data representations to four. Second, the cube is limited in the scope of analytics that can be retrieved to those which it calculates when it is constructed. This restricts business intelligence access to timely and changing answers to important business questions and often leads to a proliferation of cubes within an organization. Third, the maintenance cost to prepare and update the cubes introduces additional overhead within organizations, further increasing costs and latency concerns for timely reporting.

Data searches can be accelerated using a columnar (column-oriented) data representation. See U.S. Pat. No. 7,024,414 issued Apr. 4, 2006 to Sah et al. In such representation, each attribute's values are stored sequentially in a file or in physical storage. For example, for the database (1), sequential storage can be used to store the store ID's, cities, states, etc. See FIG. 2. Searches and other operations are fast on each attribute because fewer disk read operations are needed to fetch the attribute's values and also because the operating memory references are localized during the search. In addition, high data compression ratios are easier to achieve.

Consider an example that demonstrates the cost savings when analyzing columnar vs row-wise data storage. According to the 2000 US census, there are approximate 300 million people in the United States, where each person is represented with a demographic record in a single table in the census database. The data includes many fields, such as age, income, state, whether the person rents or owns his place of residence, the person's family size, zip code, employment information, etc. For this example let us assume that each record is 1000 bytes. The database therefore contains about 300 GB (gigabytes) of detail data. We can write an SQL query to calculate and return the average ages of residents of each of the 50 states with the following simple query:

SELECT AVG(Age), State from Census GROUP BY State;

In a traditional row-wise HDS, the entire contents of the table may be scanned, and the information in the Age (4 bytes) and State (2 bytes) fields will be extracted. However, in a columnar database (CDB), i.e. in the database in which each attribute is stored in columnar form, only the two columns relevant to the query will be read from disk, totaling 0.9 GB of data (assuming a conservative 50% compression), or a reduction of 99.7% of physical disk IO. An HDS with a sustained effective IO rate of 500 MB/sec will require 60 seconds to read the data for this query. Because CDB data is stored by column where consecutive row values for each field are contiguous, the physical disk IO time is reduced to less than 2 seconds.

As described in the aforementioned U.S. Pat. No. 7,024,414, CDB data can be divided among different compute nodes, each with its own storage node. Each storage node stores its data in columnar form. Data may be replicated on adjacent storage nodes to provide security against storage or compute node failures. A query master divides query processing among compute nodes as needed. Efficient selection of compute nodes for each query execution is critical for short execution times.

SUMMARY

This section summarizes some features of the invention. Other features are described in the subsequent sections. The invention is defined by the appended claims which are incorporated into this section by reference.

In some embodiments of the present invention, the same data is stored in at least two different database management systems (DBMS's), including a columnar DBMS and a non-columnar (e.g. row-oriented) DBMS. The columnar DBMS may provide fast responses to queries involving aggregation, and such queries can be routed to the columnar DBMS. A query may be routed to the non-columnar DBMS if for example the query execution involves only small DBMS tables on the non-columnar DBMS. In some situations, an execution time estimate can be obtained from each DBMS, and the query is routed to the DBMS providing the shortest estimate.

In some embodiments, the performance gains due to such query handling may eliminate the need for DMs and OLAP cubes as partial solutions to the organizational problems outlined here.

The invention is not limited to the features and advantages described above. Other features are described below. The invention is defined by the appended claims.

DESCRIPTION OF SOME EMBODIMENTS

The embodiments described in this section illustrate but do not limit the invention. The invention is defined by the appended claims.

Figure 3:
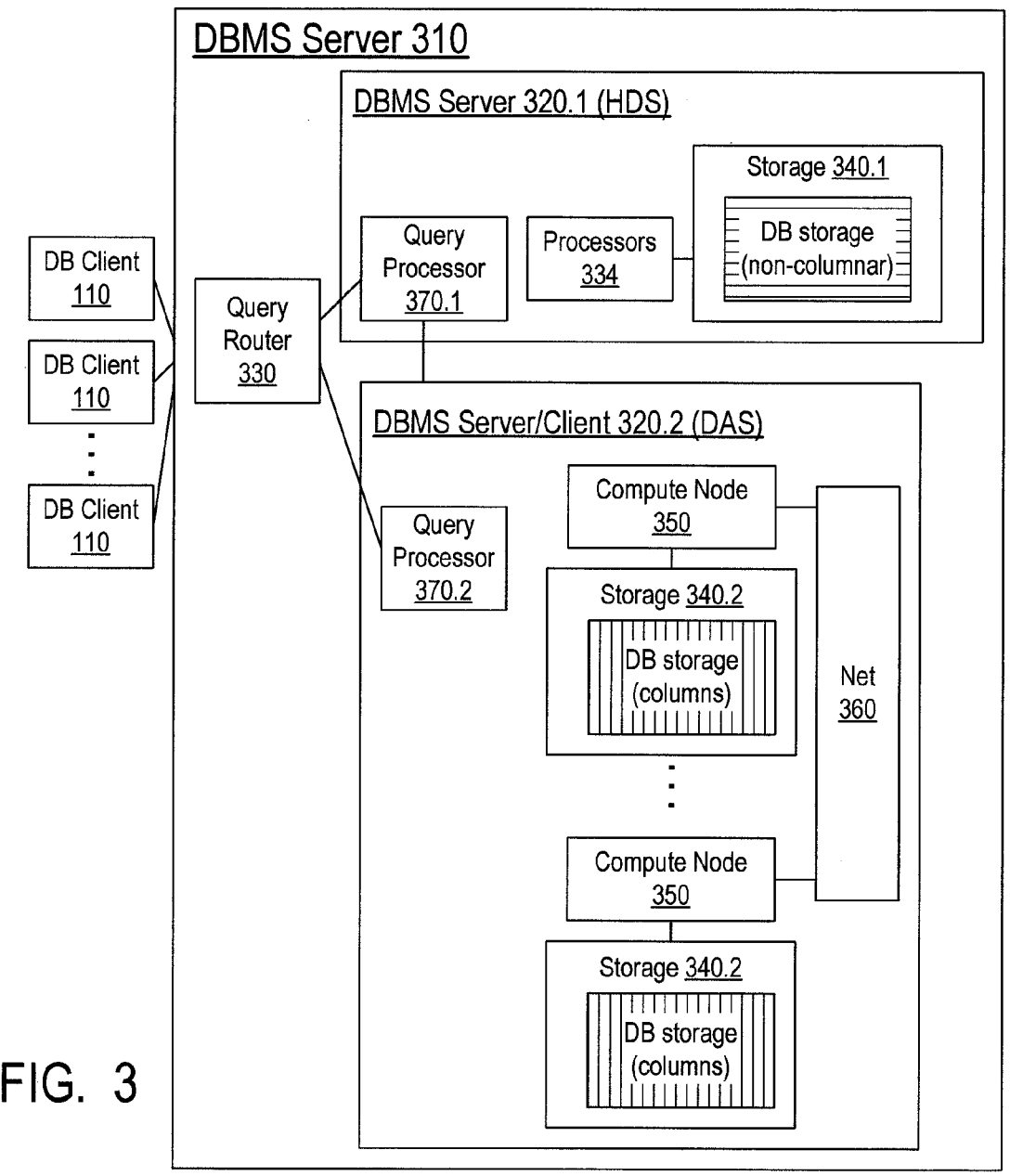
FIG. 3 is a block diagram illustrating a database management system according to some embodiments of the present invention.

FIG. 3 illustrates a database management system 310 according to some embodiments of the present invention. DBMS 310 includes two database management sub-systems 320.1, 320.2. Systems 320.1, 320.2 store the same data, but in different formats. System 320.2 uses columnar format, and system 320.1 uses non-columnar format for at least some of the attributes stored in columnar format by DBMS 310.2. Query router 330 routes each query to one of systems 320.1, 320.2 for execution. The system 320.1 or 320.2 is selected based on a number of factors including state changes to the data and efficiencies and inefficiencies of the columnar format.

In this embodiment, each DBMS server 320 (i.e. each server 320.1, 320.2) is implemented on its own hardware. DBMS server 320.1 uses SMP (symmetric multiprocessing) architecture in which one or more computer processors 334 share operating memory (not shown) and also share large secondary storage 340.1 (e.g. disks) used as database storage. As stated above, at least some data is stored in non-columnar form. The non-columnar form may include row-oriented table format for some or all of the data, and/or multidimensional tables with or without OLAP cubes, and possibly other types of data structures. DBMS server 320.1 provides fast responses to some types of queries, e.g. if simple indexed record lookups are performed or the tables involved are short. DBMS server 320.2 is designed to be fast on complex analytic queries, e.g. queries that require a sum or some other aggregation operation to be performed on different records, or queries for a preset number of records at the beginning or the end of a record list ordered by some attribute values. DBMS server 320.2 uses share-nothing MPP (massively parallel processing) architecture with a number of compute nodes 350 which do not share their operating memory (not shown) and or their storage devices 340.2 in which the database is stored. Each storage device 340.2 can be storage media or a storage node with its own computer processors. Each storage node 340.2 stores one or more database attributes in columnar form. Compute nodes 350 communicate via some interface 360, possibly a local area network (e.g. Ethernet).

DBMS server 320.1 has its own query processor module 370.1 which can be implemented on a separate computer or on processors 334. DBMS server 320.2 has its own query processor module 370.2 which can be implemented on a separate computer or with software running on one or more of compute nodes 350.

In this embodiment, server 320.2 is also a client of server 320.1. The data are owned by server 320.1. Server 320.2 periodically queries server 320.1 for data updates, converts the data received from server 320.1 to columnar form, and distributes individual columns to storage nodes 350 for storage on devices 340.2. Different storage devices may store different columns, or some columns may be replicated on multiple storage devices, as needed to provide fast parallel execution of complex analytic queries and, possibly, protection against data loss. See e.g. the aforementioned U.S. Pat. No. 7,024,414. In some embodiments, server 320.1 is an SQL server such as can be purchased from Microsoft Corporation, Oracle Corporation, or other manufacturers.

In other embodiments, the data are owned by server 320.2, which periodically sends data updates to server 320.1 in data push operations or in response to queries from server 320.1.

Figures 1, 2:
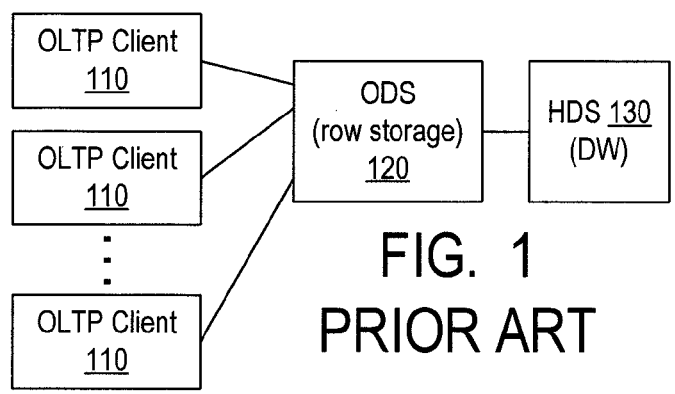
FIG. 1 is a block diagram illustrating data flow through prior art database management systems.
FIG. 2 illustrates columnar data form.

For convenience sake, server 320.1 will be referred below as HDS because in some embodiments this server incorporates the functionality of HDS 130 and ODS 120 of FIG. 1. Server 320.2 will be referred to as Data Analytic System or DAS. These reference labels are for convenience only and do not limit the invention.

Appendix 1 at the end of this section (before the claims) shows pseudocode describing some of the operations performed by query router 330 in some embodiments. Some steps (e.g. step S124) do not relate to query routing, but are shown to provide a context for clear intuitive understanding of some embodiments of the invention. Such features do not limit the invention.

Appendix 1 is largely self-explanatory. Section I describes query routing based on the user or application 110 (step S110) issuing the query. Steps S124, S128 check if the user has the right to access DBMS 310 or the server 320.1 or 320.2. If the user has limited access rights, the access may be denied (step S124), or the query may be routed based on such rights (step S128). Once the query is routed, the routing operation terminates. Generally in Appendix 1, once a query routing decision is made (e.g. "route the query to DAS 320.2" at step S128), it is assumed that the query routing terminates. Statements like "route to DAS" or "route to HDS" refer to routing the query to DAS 320.2 or HDS 320.1.

Figure 4:
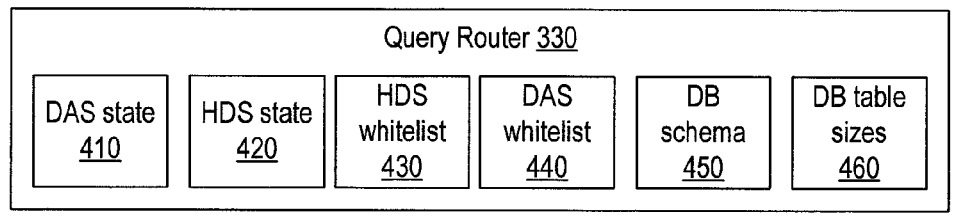
FIG. 4 is a block diagram of query router storage according to some embodiments of the present invention.

In section II, routing operations are performed based on execution environment. Referring to step S210, query router 330 maintains information 410 (FIG. 4) on the state of DAS 320.2. Information 410 specifies if DAS 320.2 is in a data synchronization cycle, i.e. in the process of obtaining data updates from HDS 320.1, converting these updates to columnar form, and distributing the columns to compute nodes 350. DAS 320.2 informs query router 330 of the start and end of each synchronization cycle. Likewise (step S220), HDS 320.2 informs query router 330 of the start and end of each maintenance cycle (e.g. disk defragmentation), backup cycle, and/or update cycle. Query router 330 records such information in the query router's storage area 420 (FIG. 4). Referring to step S230, DAS 320.2 may periodically inform the query router (via a message or simply a time-out) that DAS 320.2 is unavailable for new queries.

Referring to steps S310, S320, query router 330 may be configured to always send some queries to HDS 320.1 (these queries are defined in the router's "HDS whitelist" storage 430), and to always send some queries to DAS 320.2 ("DAS whitelist" storage 440). Such configuration can be performed by a database administrator or by users having appropriate privileges. The HDS whitelist may specify, for example, all queries referring to particular attributes if these attributes are not stored on DAS 320.2 (DAS 320.2 may copy less than all data from HDS 320.1). A whitelist may also take into account that some queries are not real time, and hence should not be routed to DAS 320.2, or on the contrary are real time and hence should be routed to DAS.

Referring to steps S330, S340, servers 320.1, 320.2 may be designed for different query languages or different language features. For example, query processors 370.1, 370.2 may or may not understand all the features of a particular query language (e.g. SQL). Thus, DAS 320.2 can be a flexible system capable of being combined with different types of HDS 320.1. Query router 330 scans the query for key words or other language constructs that are unavailable on one of servers 320.1, 320.2.

Referring to step S350 (which may or may not be part of step S330), an HDS manufacture may also manufacture an application 110 that invokes proprietary stored procedures not documented and hence not implemented on DAS 320.2 if the DAS is manufactured by a different manufacture.

Regarding steps S410, S420, the data are owned by HDS 320.1 in this embodiment, so the HDS is always current. DAS 320.2 may have stale data if the data was modified between DAS update cycles. Query router 330 can estimate whether or not it is possible for DAS 320.2 not to be current at any given time because query router 330 records the time of the last query requiring data modification and because the query router is informed by the DAS when a DAS update cycle begins and ends. If a service level agreement (SLA) with a particular user or group of users requires the user's query to be performed on current data, or on data that is stale by no more than some predefined length of time (e.g. two minutes), and the DAS may be unable to meet the SLA, the query is routed to the HDS.

Regarding step S430, query router 330 stores the database schema (as shown at 450) of the database stored on HDS 320.1 and maintains the current table sizes (as shown at 460) of the HDS database tables. At step S430, query router 330 may create an estimated (approximate) execution plan for the query for HDS 320.1 to determine at least approximately which tables would be used if the query were routed to the HDS. Alternatively, query router 330 may request query processor 370.1 to provide an execution plan for the query (using an SQL construct EXPLAIN for example). In either case, query router may perform step S430 based on the maximum size of the tables to be used by the HDS for the query. For example, in some embodiments, if the maximum size is less than a predefined number, the query is routed to the HDS. Other table size algorithms can also be used. For example, in some embodiments, query router 330 routes the query to the HDS at this step if the sum of the table sizes does not exceed a predefined limit.

Step S510 is performed in some embodiments in which indexes on columns are not implemented on DAS 320.2. The query router determines wither the most efficient execution plan on HDS 320.1 uses indexes on columns. In some embodiments, this is determined by requesting DAS 320.2 (query processor 370.2) to provide the most efficient execution plan. In some embodiments, the execution planner in query processor 370.2 is essentially as in PostgreSQL release 8.2. PostgreSQL is a relational database management system maintained by PostgreSQL Global Development Group (World Wide Web URL http://www.postgresql.org/). Other execution planners are also possible. In particular, in some embodiments the DAS execution planner takes into account the particulars of the DAS architecture. For example, the columns may be compressed in DAS, and the compression may lead to faster execution times. Also, data may have to be transferred from one compute node 350 to another to execute the query, and further, data sorting may be performed quite fast on the columns. These factors may or may not be taken into account by the DAS planner.

If the execution most efficient execution plan as computed by DAS uses indexes, the query is routed to HDS.

Step S510 is omitted in some embodiments in which the DAS implements the index tables.

Referring to step S514, aggregation refers to a summary presentation of information obtained from different records. For example, aggregation may refer to a combined sales figure obtained from different sales records, or to maximum sales, or to the top ten sales years.

At step S520, the HDS execution time is estimated from the approximate or actual execution plan obtained as explained above in connection with step S430. The DAS execution time was estimated at step S510.

The invention is not limited to the embodiments described above. For example, at step S520, the query can be routed to the HDS if the expected DAS and HDS execution times are identical. Server 320.1 does not have to be a relational DBMS. The functions of one or both of query processors 370.1, 370.2 can be performed by the query router. In some embodiments, query router 330 runs on the HDS or DAS. In some embodiments, query router 330 runs on a separate computer, but some of the query routing operations are performed by the HDS or DAS. For example, at step S320, the router may find the query in the DAS whitelist and route it to DAS, but DAS may itself perform step S330 and determine that the query uses language features not available on the DAS. DAS may then route the query to the HDS. The invention is not limited to the order of steps in Appendix 1. For example, steps S330, S340 may be performed concurrently, with the query router scanning the query to determine for each keyword if the keyword is in the list of keywords available on only one of the HDS and DAS servers. Steps S350, S410 may be performed at the same time. The query router may route queries among more than two DBMS servers, with at least one DBMS being columnar. For example, the query router may first execute steps S410-S440 to determine if the query should preferably be routed to a columnar DBMS or a non-columnar DBMS, without determining the particular columnar or non-columnar DBMS. Then other steps can be performed to select the particular columnar or non-columnar DBMS from the set of columnar DBMS's or non-columnar DBMS's available. DAS 320.2 can be a relational database storing only detail data (i.e. no aggregated data), with any aggregations performed only in response to queries. The invention is not limited to such embodiments however.

Some embodiments of the present invention provide a database access method comprising: (1) obtaining a database query referring to data which is stored in each of a plurality of databases (e.g. 320.1 and 320.2), the plurality of databases comprising one or more first databases (e.g. the database managed by HDS 320.1) and one or more second databases (e.g. the database managed by DAS 320.2), wherein at least one attribute of the data is stored in columnar form in each second database but not in any first database; (2) determining if the query is to be executed on one or more of the first databases or one or more of the second databases; (3) providing the query to the one or more of the first databases or the one or more of the second databases as determined in operation (2).

In some embodiments, operation (2) comprises estimating whether the query execution time is shorter on the one or more of the first databases or the one or more of the second databases. See step S520 for example.

In some embodiments, operation (2) comprises performing a test on a size or sizes of at least one first database's table or tables containing data referenced by the query. See step S430 for example.

In some embodiments, each first database is managed by a respective first DBMS (e.g. 320.1), and each second database is managed by a respective second DBMS (e.g. 320.2); and each the second DBMS queries and obtains data from one or more of the first DBMS's, but each first DBMS is unable to query any second DBMS.

In some embodiments, operation (2) comprises performing one or more tests on the query (e.g. a test can be a step or a number of steps of Appendix 1), the one or more tests comprising a test for checking if the query is to compute an aggregation (e.g. step S514) and for determining that the query is to be executed on one or more of the second databases if the query is to compute an aggregation.

The invention includes a computer system for performing the methods described above, and also includes a computer readable medium (e.g. a disk, a flash memory, or some other type of computer readable storage) comprising a computer program operable to cause a computer system to perform any of the methods described above.

The invention also includes network transmission methods (such as used for downloading a computer program) comprising transmitting, over a network, a computer program operable to program a computer system to perform any of the methods described above.

Some embodiments provide a database management system comprising: one or more first DBMS's; and one or more second DBMS's for storing data stored by the first DBMS's, with at least one attribute of the data stored in columnar form on at least one second DBMS but not on any first DBMS; wherein the database management system comprises a query router (which may or may not be part of one or more of the first and second DBMS's) for routing a query to one of the first and second DBMS's.

Other embodiments and variations are within the scope of the invention, as defined by the appended claims.

Appendix 1—Query Router Pseudocode

Section 1. User or Application Rules

S110. A user executes an application 110 which sends a query to Query Router 330.

S124. If the user does not have privileges for DBMS 310, return an error message to the application.

S128. If the user has privileges for HDS 320.1 only, route the query to HDS 320.1. If the user has privileges for DAS 320.2 only, route the query to DAS 320.2.

S130. If application 110 is an OLTP application (transaction client), route the query to HDS server 320.1.

Section II. Execution Environment Rules

S210. If DAS 320.2 is in a data synchronization cycle, route to HDS 320.1.

S220. If HDS 320.1 is in a data maintenance, backup or update cycle, route to DAS 320.2.

S230. If DAS availability is low due to high query volume or long running queries, route to HDS 320.1;
Else route to DAS
Section III. Query Syntax Rules
S310. If the query is in the HDS whitelist, route to HDS 320.1.
S320. If the query is in the DAS whitelist, route to DAS 320.2.
S330. If the query uses language features only available in HDS 320.1, route to HDS 320.1.
S340. If the query uses language features only available in DAS 320.2, route to DAS.
S350. If the query executes a stored procedure that uses features or special functions in the HDS, route to the HDS.
Section IV. Data Routing Rules
S410. If the query modifies data (e.g. is Insert, Delete, or Update, or executes a stored procedure that modifies data), route to HDS.
S420. If the query requires real time data currency SLA (Service Level Agreement) and the DAS is not current, route to HDS.
S430. If the query involves only small tables, route to HDS.
S440. If the query executes a stored procedure that references external data (i.e., data not loaded into the DAS), route to HDS.
Section V. Execution Time Rules
S510. If the most efficient execution plan uses indexes on columns, route to HDS.
S514. If the query computes aggregations, route to DAS.
S520. If the query has a shorter expected execution time on the HDS than on DAS, then route to HDS, else route to DAS.

The invention claimed is:

1. A database access method comprising:
   (1) receiving a database query relating to data which is stored in each of a first database and a second database, wherein the first database and the second database are two separate and discrete databases, wherein the first database is managed by a first database management system that includes a first query processor configured to execute queries directed to the first database, wherein the second database is managed by a second database management system that is distinct from the first database management system, the second database management system including a second query processor configured to execute queries directed to the second database, wherein at least one attribute of the data stored in the first database is stored in columnar form, and wherein none of the attributes of the data stored in the second database are stored in columnar form;
   (2) determining, externally from each of the first database management system and the second database management system, if the database query is to be executed on the first database or the second database based on the processing required by the database query and the form in which data is stored by the first and second database management systems, the determining comprising, checking if the database query involves computation of an aggregation and determining that the database query is to be executed on the first database responsive to the database query involving computation of an aggregation; and
   (3) providing the database query to the first query processor or the second query processor based on the determination made in operation (2).

2. The method of claim 1 wherein the determination made at operation (2) is based at least in part on an estimation of a query execution time for executing the database query with the first database management system and/or on an estimation of a query execution time for executing the database query with the second database management system.

3. The method of claim 2 wherein operation (2) comprises generating, externally from each of the first database management system and the second database management system, a request for an execution plan for the database query for the first database management system and/or a request for an execution plan for the database query for the second database management system.

4. The method of claim 2 wherein operation (2) comprises:
generating, externally from the first database management system, a request for the first database management system to generate an execution plan for executing the database query; and
generating, externally from the second database management system, a request for the second database management system to generate an execution plan for executing the database query.

5. The method of claim 1 wherein operation (2) comprises obtaining a size or sizes of at least one table associated with the second database that includes data referenced by the database query.

6. The method of claim 1 wherein the first database is a columnar database.

7. The method of claim 1 wherein the first database management system is implemented in a first set of computer hardware, and the second database management system is implemented in a second set of computer hardware that is discrete and separate from the first set of computer hardware.

8. The method of claim 1 wherein the first database management system queries and obtains data from the second database management system, and the second database management system is unable to query the first database management system.

9. A system configured to execute database queries, the system comprising:
one or more processors, configured to execute one or more computer program modules, the computer program modules comprising:
a first database management system that manages a first database, wherein at least one attribute of the data within the first database is stored by the first database management system in columnar form, the first database management system including a first query processor configured to execute queries directed to the first database;
a second database management system that is distinct from the first database management system, the second database management system managing a second database, wherein the first database and the second database are two separate and discrete databases, and wherein no attribute of the data within the second database is stored by the second database management system in columnar form, the second database management system including a second query processor configured to execute queries directed to the second database; and
a query router that is external to each of the first database management system and the second database management system, the query router being configured to receive a database query for data stored in each of the first database and the second database, to determine whether the database query should be executed by the first query processor on the first database or by the second query processor on the second database based on the processing required by the database query and the form in which data is stored by the first and second database management systems, and to route the database query to the appropriate one of the first query processor or the second query processor, wherein the query router determines if the database query involves computation of an aggregation and routes the database query to the first query processor responsive to the database query involving computation of an aggregation.

10. The system of claim 9 wherein the first database management system includes a columnar database management system.

11. The database management system of claim 9 wherein each said first and second database management systems comprise an execution planner for providing an estimated execution time for executing a database query, and wherein the query router is further configured to request estimated execution times for execution of the database query from the execution planners associated within each of the first and second database management systems.

12. A system configured to route database queries, the system comprising:
one or more processors, configured to execute one or more computer program modules, the computer program modules comprising:
a query router configured to communicate with (i) a first database management system that manages a first database, the first database management system including a first query processor configured to execute queries directed to the first database, and (ii) a second database management system that manages a second database, the second database management system including a second query processor configured to execute queries directed to the second database,
wherein the first database and the second database are two separate and discrete databases,
wherein the first database management system is distinct from the second database management system, and the query router is external to both of the first and second database management systems,
wherein the first database management system stores at least one attribute of the data in the first database in columnar form, and the second database management system does not store any attributes of the data in the second database in columnar form, and
wherein the query router is further configured to receive a database query for data stored in each of the first database and the second database, to determine whether the database query should be executed by the first query processor on the first database or by the second query processor on the second database based on the processing required by the database query and the form in which data is stored by the first and second database management systems, and to route the database query to the appropriate one of the first database management system or the second database management system, wherein the query router determines if the database query involves computation of an aggregation and routes the database query to the first database management system responsive to the database query involving computation of an aggregation.

13. The system of claim 12 wherein the first database management system includes a columnar database management system.

* * * * *